A. A. BRITT.
VALVE.
APPLICATION FILED APR. 13, 1914.
1,154,577.
Patented Sept. 21, 1915.
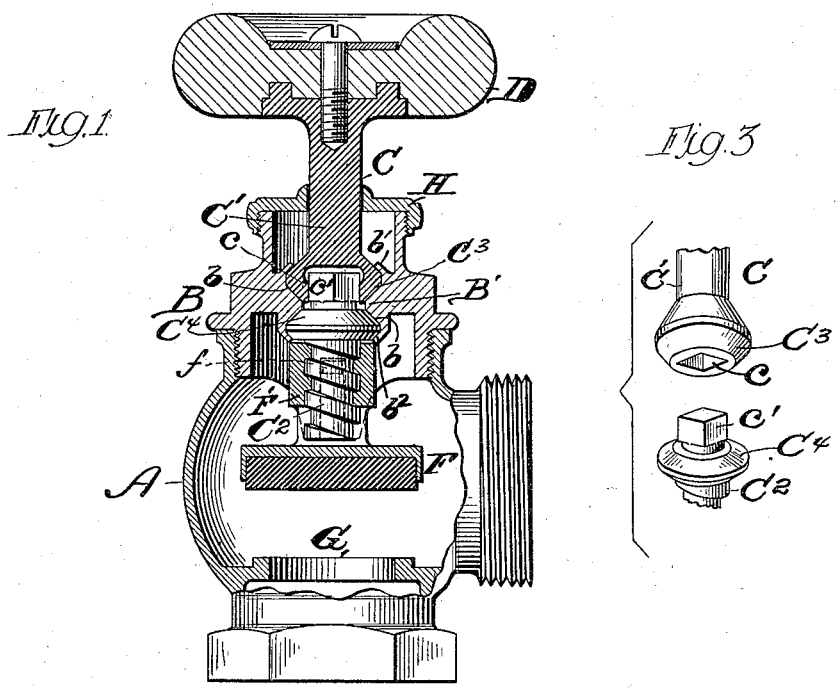
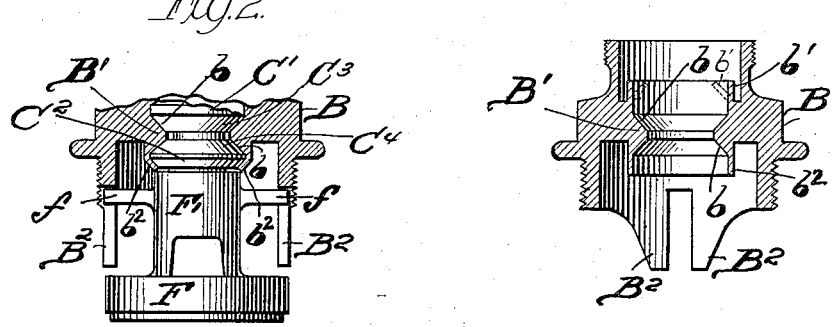
Witnesses
E. R. Barrett
C. Maletic
Inventor
Alfred A. Britt
By S. E. Thomas
Attorney

UNITED STATES PATENT OFFICE.

ALFRED A. BRITT, OF DETROIT, MICHIGAN.

VALVE.

1,154,577.  Specification of Letters Patent.  Patented Sept. 21, 1915.

Application filed April 13, 1914. Serial No. 831,513.

*To all whom it may concern:*

Be it known that I, ALFRED A. BRITT, a citizen of the United States, residing at Detroit, county of Wayne, State of Michigan, have invented a certain new and useful Improvement in Valves, and declare the following to be a full, clear, and exact description of the same, such as will enable others skilled in the art to which it pertains to make and use the same, reference being had to the accompanying drawings, which form a part of this specification.

My invention relates to an improvement in valves for use on pressure or vacuum systems, shown in the accompanying drawings and more particularly pointed out in the following specification and claims.

The object of the present invention is to provide a simple and inexpensive packless valve of relatively few parts adapted for use on pressure, hot water, or vacuum systems, sanitary fixtures, or other installations.

A further object is to eliminate all springs or other resilient devices usually employed in valves of this type to force the flange disk of the valve stem to its seat.

Other advantages and improvements will hereafter appear.

In the drawings accompanying this specification:—Figure 1 is a vertical sectional view through the valve with parts in elevation. Fig. 2 is a fragmentary sectional view through the valve bonnet at right angles to Fig. 1 showing a portion of the valve stem and valve disk in elevation. Fig. 3 is a fragmentary perspective view of the jointed valve stem. Fig. 4 is a vertical cross sectional view of the valve bonnet.

Referring now to the letters of reference placed upon the drawings:—A denotes the body of the valve, B the bonnet, having a screw-threaded engagement with the valve body.

$B'$ is an annular flange integral with the bonnet having a seat $b$ on its upper and lower face (preferably beveled) to receive the disks of the valve stem.

$b'$ is an annular collar projecting upwardly from the flange $B'$, and $b^2$ is a similar collar projecting downwardly from the underside of the flange.

C denotes a jointed valve stem, D, an operating handle engaged to the upper portion $C'$, of the valve stem, the latter being provided at its opposite end with a squared socket $c$, to receive the squared end $c'$, of the lower screw-threaded portion $C^2$, of the valve stem.

$C^3$, $C^4$ are disks (preferably bevel faced), formed respectively on the interlocking ends of the valve stem, and adapted when assembled to bear against the upper and lower seats $b$, formed in the annular flange $B'$, of the valve bonnet. The upper and lower portions of the valve stem are held in locked relation and contiguous to their seats on the upper and lower faces of the flange $B'$ by bending or "burring" the annular collars $b'$, $b^2$, so as to overlap the flange $B'$, as indicated in Fig. 1, and in dotted lines in Fig. 4 of the drawings.

F indicates the valve disk, and $F'$ its annular shank having a screw-threaded engagement with the lower portion $C^2$ of the valve stem.

$f$, $f$, are ears integral with the shank F projecting between the spaced lugs $B^2$, $B^2$, of the bonnet whereby the valve is secured against rotation upon the stem when the latter is operated to force the valve to its seat G.

H denotes a cap sleeved on the upper portion of the valve stem having a screw-threaded engagement with the neck of the bonnet B.

Having indicated the several parts by reference letters the construction and operation of the device will be readily understood.

In assembling the parts, the upper and lower portions of the valve stem are placed upon their respective seats $b$ in the upper and lower face of the flange $B'$ of the valve bonnet, the collars $b'$, $b^2$ are then bent to overlap the flanges or disks of the stem thereby joining the sections of stem together through the valve bonnet, while permitting freedom of rotation within the latter. The screw-threaded shank $F'$, of the valve, with its projecting ears $f$, $f$, lodged between the lugs $B^2$, $B^2$ of the valve bonnet, being engaged by the screw-threaded end of the valve stem;—the bonnet is screwed into place upon the valve body ready for installation. To actuate the valve F, the handle D is operated in the usual manner. The squared socket at the lower end of the upper portion of the valve stem coacting with the squared end of the lower threaded portion of the stem serves to rotate the latter thereby causing the shank of the valve to travel up or down the threaded portion of the stem to raise or seat the valve as may be desired.

It will be obvious that when the valve is employed on a pressure system, the pressure of steam or the like bearing upon the disk $C^4$ will force it to its seat thereby serving to seal the valve against leakage around the stem. When employed upon a vacuum system the vacuum will draw the disk $C^3$ to its seat thus insuring the system against loss at the valve stem.

The metal forming the collars $b^2$ of the valve bonnet, bent to overlap the jointed sections of the valve stem being comparatively thin will expand more readily than the flanges carried by the stem thus insuring freedom of rotation of the valve stem within the flange of the bonnet.

Having thus described my invention, what I claim is:—

1. In a device of the character described, a body provided with a valve seat and an annular flange encircling the valve stem, a divided valve stem comprising upper and lower interlocking portions, the lower portion being screw threaded to engage the screw threaded shank of a valve head and provided with a flange adapted to bear against the lower face of the annular flange of the body portion, the upper portion of said valve stem having a flange adapted to bear against the upper face of the annular flange, means integral with the annular flange to hold the stem sections together, a valve head having a screw threaded shank to receive the threaded end of the valve stem, means to secure the valve shank against rotation upon the stem while admitting of its reciprocation thereon, and means for manually rotating the stem, whereby the valve may be raised or seated.

2. In a device of the character described, a body provided with a valve seat, a bonnet having an annular flange with a seat on each side of the flange to receive the disks of a jointed valve stem, an annular collar integral with the flange, projecting from each side of the latter and bent to overlap the disks of the valve stem whereby the parts are connected together, a jointed valve stem, consisting of a lower screw-threaded stem portion, designed to engage the screw-threaded shank of a valve and provided with a disk seated against the underside of the flange and the upper coöperating interlocking stem portion, provided with a disk seated against the upper side of the flange, means for manually rotating the jointed stem, a valve having a screw-threaded shank engaging the screw-threaded portion of the stem, and means to secure the shank against rotation upon the valve stem.

3. In a device of the character described, a body portion provided with a valve seat, a bonnet portion secured to the body formed with an annular flange having a bevel faced seat on each side of the flange to receive disks carried by a valve stem, a valve stem comprising two sections connected together, each section having a bevel faced disk respectively adapted to be seated on opposite sides of the annular flange, overlapping portions integral with the flange adapted to secure the disks of the valve stem in contiguous relation to their seats while permitting free rotation of the stem, a handle fitted to one section of the stem to provide for its manual rotation, the other section of the stem being screw-threaded to engage the shank of a valve disk, a valve disk provided with a screw-threaded shank engaged by the valve stem, and means to secure the shank against rotation upon the stem that it may reciprocate on the stem upon rotating the latter to open and close the ports through the valve body.

4. In a device of the character described, a body portion provided with a valve seat, a bonnet portion secured to the body formed with an annular flange having a bevel faced seat on each side of the flange to receive a coöperating bevel shaped flange carried by the respective sections of a jointed valve stem, the valve stem comprising two sections, one of said sections being formed with a squared socket to receive the squared end of the connecting section, whereby the sections may be rotated together while providing for a slight lengthwise adjustment relative to each other, each section having an integral bevel-shaped flange adapted to be seated respectively on opposite sides of the annular flange, means integral with the annular flange overlapping the respective flanges of the stem sections, whereby the stem sections are held in connected relation, a valve head connected with the stem, and means for rotating the stem, whereby the valve may be opened or closed.

In testimony whereof, I sign this specification in the presence of two witnesses.

ALFRED A. BRITT.

Witnesses:
SAMUEL E. THOMAS,
CHRISTINE MALETIN.